US012418564B2

(12) United States Patent
Anderson et al.

(10) Patent No.: US 12,418,564 B2
(45) Date of Patent: Sep. 16, 2025

(54) ENHANCED ACCOUNT SECURITY MONITORING

(71) Applicant: Hewlett-Packard Development Company, L.P., Spring, TX (US)

(72) Inventors: Paul Michael Anderson, Fort Collins, CO (US); Christopher Ray Myers, Palo Alto, CA (US); Claudio Andre Heckler, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 225 days.

(21) Appl. No.: 18/342,668

(22) Filed: Jun. 27, 2023

(65) Prior Publication Data
US 2025/0007946 A1 Jan. 2, 2025

(51) Int. Cl.
*H04L 29/00* (2006.01)
*H04L 9/40* (2022.01)

(52) U.S. Cl.
CPC ...... *H04L 63/1466* (2013.01); *H04L 63/1433* (2013.01)

(58) Field of Classification Search
CPC .............. H04L 63/1466; H04L 63/1433
See application file for complete search history.

(56) References Cited

U.S. PATENT DOCUMENTS

| | | | |
|---|---|---|---|
| 11,019,090 B1 * | 5/2021 | Smith | G06F 21/40 |
| 12,003,499 B2 * | 6/2024 | Sindell | G06F 21/45 |
| 2020/0193018 A1 * | 6/2020 | Van Dyke | G06F 21/552 |
| 2020/0304544 A1 * | 9/2020 | Vasanthapuram | G06F 16/958 |
| 2021/0201330 A1 * | 7/2021 | Jain | G06Q 30/0185 |
| 2021/0266294 A1 * | 8/2021 | Chechik | H04L 63/105 |
| 2023/0078849 A1 * | 3/2023 | Seletskiy | H04L 63/101 726/23 |
| 2023/0164138 A1 * | 5/2023 | Sindell | H04L 63/0861 726/4 |
| 2024/0333710 A1 * | 10/2024 | Sindell | G06F 21/316 |

* cited by examiner

*Primary Examiner* — Don G Zhao
(74) *Attorney, Agent, or Firm* — Quarles & Brady LLP

(57) ABSTRACT

A security monitoring system is a network of distributed computing systems. The distributed computing systems include an ingestion & rules engine, a compromised identity set service, and a message bus. The ingestion & rules engine, the compromised identity set service, and the message bus may be separated in the security monitoring system geographically from any other distributed computing system in the security monitoring system. The security monitoring system may communicate electronically with an information distributor, an identity system, and external services.

21 Claims, 6 Drawing Sheets

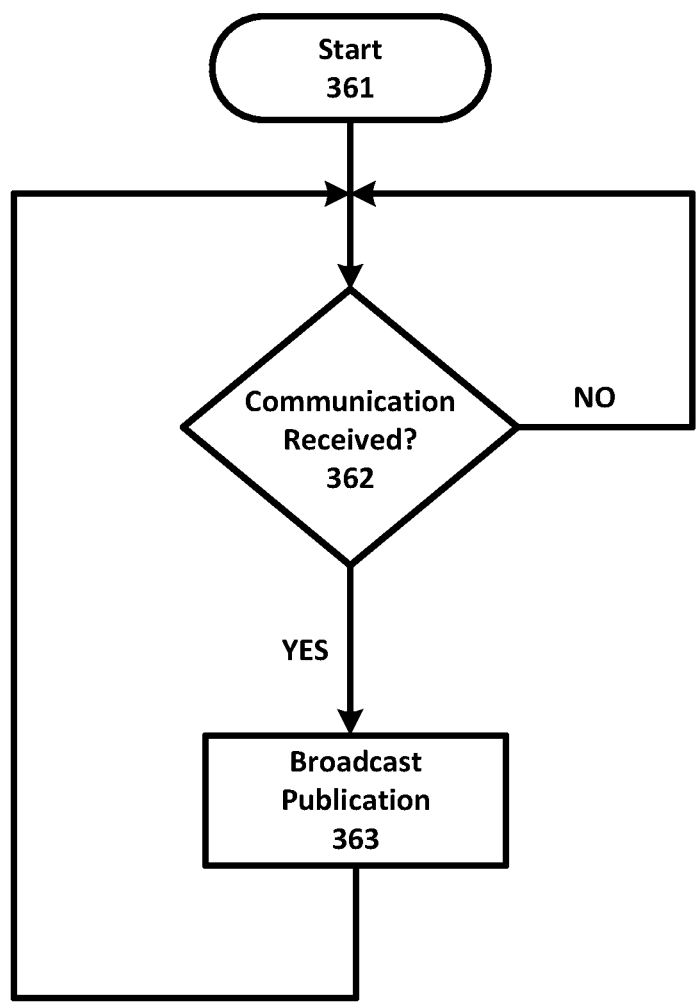

ENHANCED ACCOUNT SECURITY MONITORING

BACKGROUND

Electronic data repositories may store user personal data. This data may be used by computer systems to authenticate a user for providing access to data or services associated with the computer systems.

BRIEF DESCRIPTION OF THE DRAWINGS

The accompanying drawings, which are incorporated in and form a part of this specification, illustrate examples of the disclosure and, together with the description, explain principles of the examples. In the drawings, like reference symbols and numerals indicate the same or similar components.

FIG. 3C is a flowchart that illustrates an example of processing for a message bus.

Like elements in the various figures are denoted by like reference numerals for consistency.

DETAILED DESCRIPTION

Figure 1A:
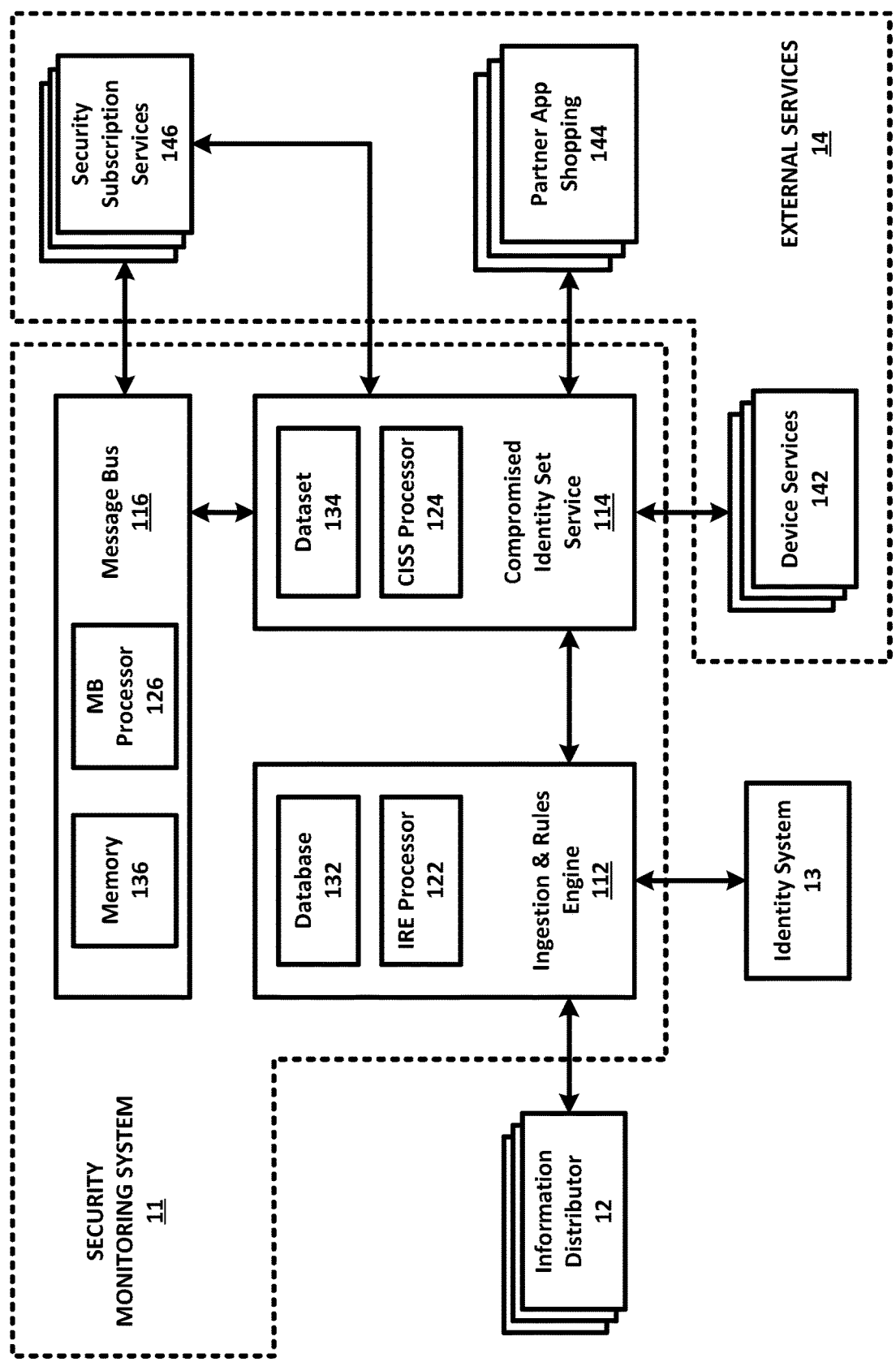
FIG. 1A illustrates a security monitoring system.

Hereinafter, exemplary embodiments are described in detail with reference to the accompanying drawings. For the sake of clarity and conciseness, matters related to the present embodiments that are well known in the art have not been described.

Embodiments of the disclosure are described in detail below with reference to the accompanying figures. Unless otherwise indicated, like parts and method steps are referred to with like reference numerals.

Electronic data repositories may store user personal data, including a user's name, address, device information, credit card information, birthdate, and the like. This data may be used by computer systems to authenticate a user for providing access to data or services associated with the computer systems. As data breaches exposing personal data of data repositories become more common, particularly given the ease with which malicious actors can obtain the data, the widespread abuse of compromised personal data (including user credentials) will only increase. Users and companies can do little to prevent malicious use of data once exposed, leaving consumers open to fraud and companies to experience unauthorized access to systems and financial loss due to that fraud. While there are known repositories of users' account information and passwords exposed on the public Internet and the dark web, vast amounts of other personal data can also be utilized for nefarious purposes. For example, an ecommerce site could use the last four digits of a credit card for verification for purchase authorization, or a healthcare site could use the last four digits of a social security number as a form of verification to make account changes. When this type of information is made available as the result of a data breach, the ecommerce or healthcare site may not know the specifics of a breach and accept this information as a valid form of verification and allow a process or transaction to continue.

Embodiments provided herein address these and other technical issues associated with data breaches of personal information in electronic data repositories. For example, embodiments provided herein enable, among other things, identification of personal information involved in a data breach and electronic notification of impacted users and systems.

FIG. 1A illustrates a security monitoring system 11. The security monitoring system 11 is a network of distributed computing systems. The distributed computing systems include an ingestion & rules engine 112, a compromised identity set service 114, and a message bus 116. The ingestion & rules engine 112, the compromised identity set service 114, and the message bus 116 in the security monitoring system 11 may be separated geographically from any other distributed computing system in the security monitoring system 11. The ingestion & rules engine 112, the compromised identity set service 114, and the message bus 116 may perform their tasks autonomously. The security monitoring system 11 may communicate electronically with an information distributor 12, an identity system 13, and external services 14.

Figure 1B:
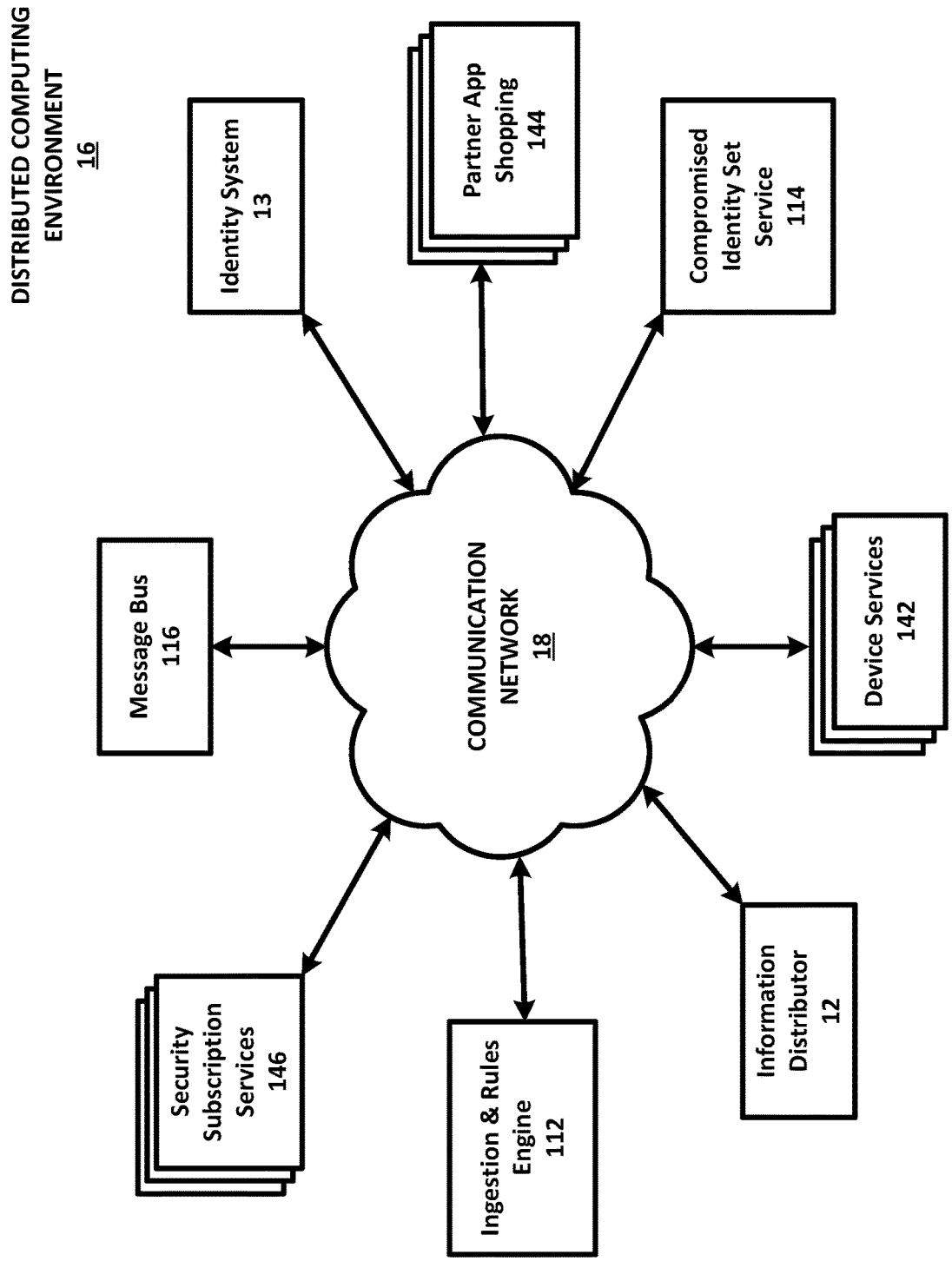
FIG. 1B illustrates the security monitoring system in a distributed computing environment.

FIG. 1B illustrates the security monitoring system 11 in a distributed computing environment 16. A communication network 18 may include a public or private data network. The data network may comprise or be part of a data bus, a wired or wireless information network, a public switched telephone network, a satellite network, a local area network (LAN), a wide area network (WAN), and/or the Internet. In the distributed computing environment 16, the ingestion & rules engine 112, the compromised identity set service 114, and the message bus 116 may simultaneously perform divided tasks in parallel with each other.

Due at least in part to the ingestion & rules engine 112 being operable in the distributed computing environment 16, a human is unable to perform the functions of the ingestion & rules engine 112.

Due at least in part to the compromised identity set service 114 being operable in the distributed computing environment 16, a human is unable to perform the functions of the compromised identity set service 114.

Due at least in part to the message bus 116 being operable in the distributed computing environment 16, a human is unable to perform the functions of the message bus 116.

The ingestion & rules engine 112 may be a computing apparatus that includes software and hardware. The hardware for the ingestion & rules engine 112 may be a platform that resides at a physical, geographic location such as a country, state, county, city, or building. The ingestion & rules engine 112 may be a cloud computing platform that resides in a cloud based architecture without a designated geographic location.

The hardware for the ingestion & rules engine 112 may include an ingestion & rules engine (IRE) processor 122 and a database 132. The database 132 may be non-transitory processor readable memory containing the software for the ingestion & rules engine 112.

The software for the ingestion & rules engine 112 may include, for example, firmware, one or more applications, program data, filters, rules, one or more program modules, and other executable instructions. The software for the ingestion & rules engine 112 may be an application programming interface that permits the ingestion & rules engine 112 to electronically communicate with the database 132, the identity system 13, and the compromised identity set service 114. The application programming interface for the ingestion & rules engine 112 may be a program that when, executed, causes the IRE processor 122 to perform the processing for the ingestion & rules engine 112. The IRE processor 122 is an electronic processor.

The ingestion & rules engine 112 includes the database 132. The database 132 may include read-only memory ("ROM"), random access memory ("RAM"), other non-transitory computer-readable media, or a combination thereof. The database 132 may include the instructions that are executable by the IRE processor 122. Information stored in the database 132 is accessible to the ingestion & rules engine 112, the compromised identity set service 114, and the message bus 116.

Figure 2:
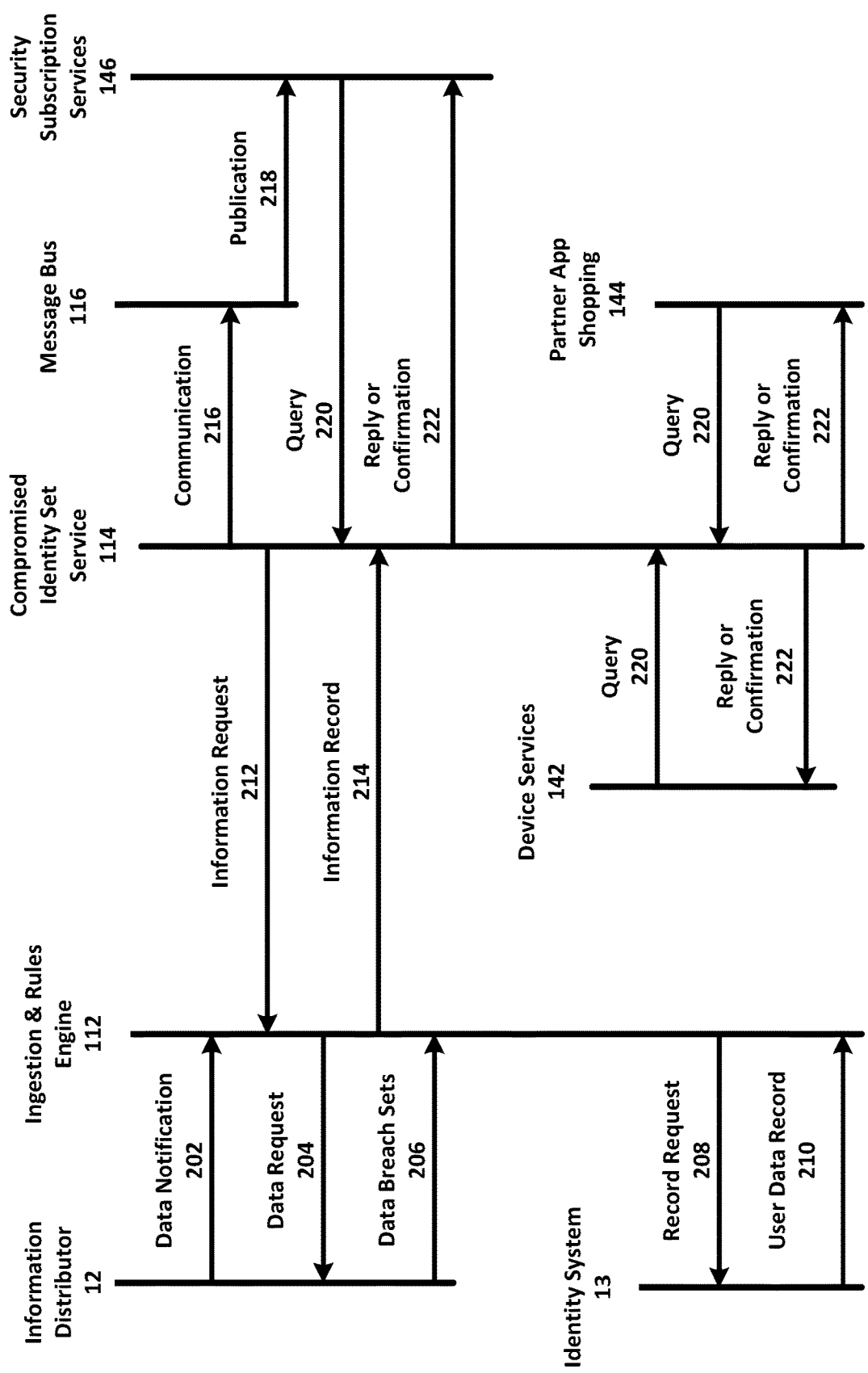
FIG. 2 illustrates a signal flow diagram for the security monitoring system.

FIG. 2 illustrates a signal flow diagram for the security monitoring system 11. With reference to FIG. 2, the ingestion & rules engine 112 is a processing engine that extracts and processes data entries from data breach sets 206 to identify user account information existing in the identity system 13 that is to be considered compromised or leaked. The data breach set 206 may be electronic information from the information distributor 12. The information distributor 12 may be a third party information provider. The information distributor 12 may be multiple third party information providers. Each third party information provider may be a government entity, a software-as-a-service (SaaS) provider, a security vendor, a secure aggregator, or any other entity that collects and distributes the data breach sets 206.

The ingestion & rules engine 112 may receive the data breach sets 206 from the information distributor 12. The data breach sets 206 may include records containing breached data. The breached data is information that is personal, sensitive, private, and/or proprietary. The breached data is obtained, appropriated and/or altered by an entity other than an owner of the information without prior authorization from the owner of the information. This breached data may include compromised information from a particular data breach. The compromised information may include usernames, passwords, addresses, credit card information, banking information, and/or any other information that is personal, sensitive, private, and/or proprietary.

The ingestion & rules engine 112 may communicate, directly or indirectly, with the information distributor 12. A firewall in the ingestion & rules engine 112 may prevent the information distributor 12 from accessing the database 132, the identity system 13, the compromised identity set service 114, and the message bus 116.

The ingestion & rules engine 112 may receive, from the information distributor 12, a data notification 202 that informs the ingestion & rules engine 112 of a new data breach set 206 for output by the information distributor 12. To receive the data breach sets 206 from the information distributor 12, the ingestion & rules engine 112 may issue a data request 204 to the information distributor 12 for the data breach sets 206. The ingestion & rules engine 112 may issue the data request 204 to the information distributor 12 as a response to the ingestion & rules engine 112 receiving the data notification 202. In some examples, the ingestion & rules engine 112 may receive the data breach sets 206 in the absence of an issuance of the data request 204 from the ingestion & rules engine 112. When the ingestion & rules engine 112 receives the data breach sets 206, the ingestion & rules engine 112 may issue a record request 208 to the identity system 13 for user account information.

The identity system 13 may be a computing apparatus that includes software and hardware. The hardware for the identity system 13 may be a platform that resides at a physical, geographic location such as a country, state, county, city, or building. The identity system 13 may be a cloud computing platform that resides in a cloud-based architecture without a designated geographic location. The hardware for the identity system 13 may include non-transitory processor readable memory containing the software for the identity system 13.

The software for the identity system 13 may include, for example, firmware, one or more applications, program data, filters, rules, one or more program modules, and other executable instructions. The instructions may include software executable by an electronic processor to enable the identity system 13 to, among other things, perform or control the functions of the identity system 13 described herein.

The software for the identity system 13 may be an application programming interface that permits the identity system 13 to electronically communicate with the ingestion & rules engine 112. The application programming interface for the identity system 13 may be a program that when, executed, causes an electronic processor to perform the processing for the identity system 13. The instructions may include software executable by the electronic processor to enable the identity system 13 to, among other things, perform or control the functions of the identity system 13 described herein during a predetermined time period.

The ingestion & rules engine 112 may receive the data breach sets 206 intermittently from the information distributor 12. The ingestion & rules engine 112 may receive the data breach sets 206 from the information distributor 12 on a schedule or a timetable.

The ingestion & rules engine 112 may extract, from the data breach sets 206, breached data pertaining to system users. A user may be a consumer, individual or entity that may purchase or use a product and/or service. The user is a system user during the time period that the user account information for the user is present in the identity system 13. The ingestion & rules engine 112 may convert the breached data into data entries when the ingestion & rules engine 112 extracts the breached data from the data breach sets 206. When converting the breached data into the into data entries, the ingestion & rules engine 112 may filter out information in the breached data that is not particularly relevant or harmful to the security of the system users. The ingestion & rules engine 112 may store the data entries into the database 132 after filtering out the information. By filtering out the information when the ingestion & rules engine 112 converts the breached data into the data entries, the ingestion & rules engine 112 may reduce the amount of storage space in the database 132 that is required to store the data entries in the database 132. The ingestion & rules engine 112 may store, into the database 132, the data entries in a format that is compatible with the records in the identity system 13.

The identity system 13 is a processing engine that receives, stores, maintains, manages, and safeguards the user account information associated with the system users. The user account information may include authentication information and profile information for each of the system users. The authentication information may include usernames, passwords, certificates, and/or any other information that is personal, sensitive, private, and/or proprietary to the system users. The user profile information may include names, addresses, phone numbers, and/or any other information that identifies the system users.

The ingestion & rules engine 112 may identify the user account information that is compromised. The user account information may become compromised user information when the ingestion & rules engine 112 detects at least a portion of the user account information in the data entries. The ingestion & rules engine 112 may designate the user account information as uncompromised user information when the ingestion & rules engine 112 fails to detect at least a portion of the user account information in the data entries. The ingestion & rules engine 112 may detect any user account information existing in the data entries when the ingestion & rules engine 112 compares the user account information to the data entries.

The identity system 13 may store the user account information for a system user in the user data record 210. The ingestion & rules engine 112 may compare the user data record 210 to the data entries to detect the breached data in the user account information for the system user. By comparing the user data record 210 to the data entries, the ingestion & rules engine 112 may determine whether or not the user data record 210 includes compromised user information.

The ingestion & rules engine 112 may schedule comparisons to occur at regular time intervals with a same amount of time between the comparisons. Alternatively, the ingestion & rules engine 112 may compare the user data record 210 to the data entries immediately upon receipt, by the ingestion & rules engine 112, of the data breach set 206 from the information distributor 12.

The ingestion & rules engine 112 may send, to the identity system 13, the record request 208 for the user data record 210 when the ingestion & rules engine 112 receives the new the data breach set 206 from the information distributor 12. When the identity system 13 receives the record request 208, the identity system 13 may output the user data record 210 to the ingestion & rules engine 112. Alternatively, the identity system 13 may, without receiving the record request 208 from the ingestion & rules engine 112, output the user data record 210 to the ingestion & rules engine 112 when the identity system 13 updates the user data record 210.

Upon receipt of the user data record 210 from the identity system 13, the ingestion & rules engine 112 may extract the data entries from the database 132. In some instances, the ingestion & rules engine 112 may extract the data entries from the database 132 prior to the ingestion & rules engine 112 receiving the user data record 210 from the identity system 13.

When the ingestion & rules engine 112 receives the user data record 210 from the identity system 13 and extracts the data entries from the database 132, the ingestion & rules engine 112 may compare the user account information for the system user with the breached data in the data entries to ascertain whether or not some of the user account information in the user data record 210 is present in at least one the data entries. By comparing the user data record 210 to the breached data, the ingestion & rules engine 112 may identify the breached data pertaining to a system user in the data entries.

The ingestion & rules engine 112 may designate the user data record 210 as being compromised when the ingestion & rules engine 112 determines that at least some of the user account information in the user data record 210 is present in at least one of the data entries.

When the ingestion & rules engine 112 determines that at least some of the user account information in the user data record 210 is present in the data entries, the ingestion & rules engine 112 may control the identity system 13 in a manner that causes the identity system 13 send an advisory to the system user. The advisory is a recommendation for the system user to update the user account information in the user data record 210 in a manner that may remove the breached data from the user data record 210.

When the ingestion & rules engine 112 determines that at least some of the user account information in the user data record 210 is present in the data entries, the ingestion & rules engine 112 may perform a risk assessment. The ingestion & rules engine 112 may a execute a risk algorithm to perform the risk assessment. The risk algorithm may be a machine learning algorithm. The machine learning algorithm may be a neural network model. The risk algorithm may be a heuristic algorithm. The ingestion & rules engine 112 may identify, in the data entries, the breached data pertaining to a system user. The user account information in the user data record 210 and the breached data pertaining to the system user are inputs to the risk algorithm.

When the ingestion & rules engine 112 executes the risk algorithm, the ingestion & rules engine 112 may calculate a value for a risk score. The risk score quantifies, for the security monitoring system 11, an amount of risk to the system user whose user account information is compromised and/or an amount of risk to entities or systems that interact with the system user. The types of risk to the system user may include theft of the system user's identity, damage to the reputation of the system user, financial damage to the system user, and/or other risks that are associated with the user data record 210 being compromised.

The risk score may quantify the severity of the of risk to the system user whose user account information is compromised. To quantify the amount of risk, the risk score may be represented by a scale that ranges from 0 to 100. For example, a risk score of 0 may suggest an absence of risk to the system user as a result of the user data record 210 being compromised. A risk score of 100 may suggest the highest amount of risk to the system user as the result of the user data record 210 being compromised.

The ingestion & rules engine 112 may generate notification information. The notification information may include identity information that uniquely identifies the system user. The notification information may also include the risk score. The notification information may include a reason for the notification information.

The ingestion & rules engine 112 may generate the notification information when the identity system 13 detects the user account information in the user data record 210 in at least one the data entries. The user account information is compromised when appropriated without authorization by the system user. The user data record 210 is compromised when the user account information in the user data record 210 is present in at least one the data entries.

The reason for the notification information may be the detection, made by the ingestion & rules engine 112, of the user account information in the user data record 210 in at least one the data entries. When the detection is the reason, the notification information may include information that highlights the user account information in the user data record 210 that is determined by the ingestion & rules engine 112 to be compromised.

The ingestion & rules engine 112 may generate the notification information when the identity system 13 creates the user data record 210. The identity system 13 may include a user interface that permits the identity system 13 to communicate with a user. The user interface may permit the user to create the user data record 210. The user is a new system user upon the instance that the identity system 13 creates the user data record 210 for the user in the absence of any other the user data record 210 for the user in the identity system 13. The reason for the notification information may be the storage, into the identity system 13, of user account information for the new system user. When the storage of the user account information for the new system user is the reason, the notification information may include information that identifies the new system user.

When the identity system 13 updates the user data record 210, the ingestion & rules engine 112 may generate the notification information. The identity system 13 may receive an instruction from the user interface that causes the identity system 13 to update the user account information in the user data record 210. Updating the user data record 210 modifies the user account information in the user data record 210. The reason for the notification information may be the modification of the user data record 210. When the updating the user data record 210 is the reason, the notification information may include the identity information along with information that pertains to the modification.

When the identity system 13 deletes the user data record 210 from the identity system 13, the ingestion & rules engine 112 may generate the notification information. The identity system 13 may receive an instruction from the user interface that causes the identity system 13 to delete, from the identity system 13, the user data record 210 for the system user. Deletion of the user data record 210 for the system user removes, from the identity system 13, the user account information for the system user. The reason for the notification information may be the deletion of the user data record 210 for the system user from the identity system 13. When the deletion is the reason, the notification information may include the identity information along with information that pertains to the deletion.

The ingestion & rules engine 112 may package the notification information in an information record 214 when the ingestion & rules engine 112 generates the notification information. When the ingestion & rules engine 112 packages the notification information in the information record 214, the ingestion & rules engine 112 may output the information record 214 to the compromised identity set service 114. For enhanced security of the information record 214, the ingestion & rules engine 112 may encrypt the information record 214 before outputting the information record 214 as an encrypted the information record 214. The information record 214 may comprise information that is exclusively for the system user.

When the ingestion & rules engine 112 outputs the notification information in the information record 214, the ingestion & rules engine 112 may output the information record 214 immediately when the ingestion & rules engine 112 generates the notification information. Alternatively, when the ingestion & rules engine 112 generates the notification information, the ingestion & rules engine 112 may output the information record 214 at a time slot within a time period. For example, the ingestion & rules engine 112 may output the information record 214 only at a specific time during a day.

The ingestion & rules engine 112 may collect notification information for the system users in a batch of the information records 214. The batch may include a subset of the user data records 210 that are in the identity system 13. The subset may include the user data records 210 in which the user account information those user data records 210 is present in in at least one the data entries. Each record in the batch may be for a system user. For example, one information record 214 in the batch may include a notification information for one of the system users whereas another information record 214 in the batch may include a notification information for another of the system users. When the ingestion & rules engine 112 collects the notification information in the batch, the ingestion & rules engine 112 may output the batch to the compromised identity set service 114. The ingestion & rules engine 112 may output the batch immediately when the ingestion & rules engine 112 collects the notification information in the batch. Alternatively, when the ingestion & rules engine 112 collects the notification information in the batch, the ingestion & rules engine 112 may output the batch at a time slot within a time period. For example, the ingestion & rules engine 112 may output the batch only at a specific time during a day.

Due at least in part to the massive amount of information in the data breach sets 206 for the ingestion & rules engine 112 to assess and process, a human is unable to perform the functions of the ingestion & rules engine 112.

The compromised identity set service 114 may be a computing apparatus that includes software and hardware. The hardware for the compromised identity set service 114 may be a platform that resides at a physical, geographic location such as a country, state, county, city, or building. The compromised identity set service 114 may be a cloud computing platform that resides in a cloud based architecture without a designated geographic location.

The hardware for the compromised identity set service 114 may include a compromised identity set service (CISS) processor 124 and a dataset 134.

The dataset 134 may be non-transitory processor readable memory containing the software for the compromised identity set service 114. The software for the compromised identity set service 114 may include, for example, firmware, one or more applications, program data, filters, rules, one or more program modules, and other executable instructions. The software for the compromised identity set service 114 may be an application programming interface that permits the compromised identity set service 114 to electronically communicate with the dataset 134, the ingestion & rules engine 112, the message bus 116, and the external services 14. The external services 14 may include the data services 142, the partner app shopping 144, and the security subscription services 146.

The application programming interface for the compromised identity set service 114 may be a program that when, executed, causes the CISS processor 124 to perform the processing for the compromised identity set service 114. The CISS processor 124 is an electronic processor.

The compromised identity set service 114 may include the dataset 134. The dataset 134 may include read-only memory ("ROM"), random access memory ("RAM"), other non-transitory computer-readable media, or a combination thereof. The dataset 134 may include the instructions that are executable by the CISS processor 124. Information stored in the dataset 134 is accessible to the compromised identity set service 114, the ingestion & rules engine 112, and the message bus 116.

The compromised identity set service 114 may communicate, directly or indirectly, with the ingestion & rules engine 112 and the external services 14. A firewall in the compromised identity set service 114 may prevent the information distributor 12 and the external services 14 from accessing the dataset 134 and the ingestion & rules engine 112.

The compromised identity set service 114 may communicate, directly or indirectly, with the ingestion & rules engine 112. The ingestion & rules engine 112 may output the information record 214 to the compromised identity set service 114 in response to an information request 212 from the compromised identity set service 114 for the information record 214. Alternatively, the ingestion & rules engine 112 may output the information record 214 to the compromised identity set service 114 in the absence of the information request from the compromised identity set service 114 for the information record 214.

The compromised identity set service 114 may receive, from the ingestion & rules engine 112, the information record 214 for the system user. The compromised identity set service 114 may receive the information record 214 as a single information record 214 or in the batch of information records 214. The compromised identity set service 114 may obtain the information record 214 from the batch of information records 214 when the compromised identity set service 114 receives the batch from the ingestion & rules engine 112. When the compromised identity set service 114 receives the information record 214 in the form of the encrypted the information record 214, the compromised identity set service 114 may decrypt the information record 214 before obtaining the notification information from the information record 214.

The dataset 134 is a data repository that stores identity files for the system users. An identity file in the dataset 134 may comprise information that is exclusively for the system user. The compromised identity set service 114 may extract, from the information record 214, the notification information for the system user when the compromised identity set service 114 receives the information record 214. When the notification information is for the new system user, the compromised identity set service 114 may create, in the dataset 134, an identity file for the new system user. The compromised identity set service 114 may obtain, from the notification information, the identity information that uniquely identifies the system user. When the compromised identity set service 114 stores the notification information in the identity file, the compromised identity set service 114 may index the identity file in the dataset 134 by the identity information.

The compromised identity set service 114 may process the notification information to determine whether or not the reason for the notification information is the detection of the user account information for the system user in at least one the data entries from the data breach sets 206. When the compromised identity set service 114 determines that the reason for the notification information is the detection of the user account information for the system user in at least one the data entries from the data breach sets 206, the compromised identity set service 114 may output, to the message bus 116, the communication 216 that notifies the message bus 116 of the compromised information in the user account information for the system user. The communication 216 may include the identity information that uniquely identifies the system user. The communication 216 may also include the risk score that quantifies the amount of risk to the system user. The communication 216 may include the reason for the notification information.

The message bus 116 may broadcast the communication 216 to the security subscription services 146 in a publication 218. The publication 218 may include the notification informing the security subscription services 146 that the user account information for the system user is compromised. The message bus 116 may broadcast the publication 218 to the security subscription services 146 in the absence of a request, from any of the security subscription services 146, for the publication 218. The publication 218 from the message bus 116 is unprompted.

For enhanced security of the publication 218, the message bus 116 may encrypt the communication 216 before broadcasting the communication 216 in an encrypted publication 218. When broadcasting the publication 218 to the security subscription services 146, the message bus 116 may broadcast the communication 216 to all of the security subscription services 146 simultaneously in a single publication 218.

The message bus 116 may broadcast the publication 218 immediately when the message bus 116 receives the communication 216 from the compromised identity set service 114. Alternatively, the message bus 116 may broadcast the publication 218 at a time slot within a time period. For example, the message bus 116 may broadcast the publication 218 only at a specific time during a day.

The message bus 116 may collect a plurality of the communications 216 in a batch of publications 218. Each communication 216 in the batch of publications 218 may be for a separate and distinct system user. For example, a communication 216 in the batch of publications 218 may notify the message bus 116 of the compromised information in the user account information for one of the system users whereas another communication 216 in the batch of publications 218 may notify the message bus 116 of the compromised information in the user account information for another of the system users. When the message bus 116 collects the communications 216 in the batch of publications 218, the message bus 116 may broadcast the batch of publications 218 to the security subscription services 146. The message bus 116 may broadcast the batch of publications 218 immediately when the message bus 116 collects the communications 216 in the batch of publications 218. Alternatively, when the message bus 116 collects the communications 216 in the batch of publications 218, the message bus 116 may broadcast the batch of publications 218 at a time slot within a time period. For example, the message bus 116 may broadcast the batch of publications 218 only at a specific time during a day.

The message bus 116 may be a computing apparatus that includes software and hardware. The hardware for the message bus 116 may be a platform that resides at a physical, geographic location such as a country, state, county, city, or building. The message bus 116 may be a cloud computing platform that resides in a cloud based architecture without a designated geographic location.

The hardware for the message bus 116 may include a message bus (MB) processor 126 and memory 136. The memory 136 may be non-transitory processor readable memory containing the software for the message bus 116. The software for the message bus 116 may include, for example, firmware, one or more applications, program data, filters, rules, one or more program modules, and other executable instructions. The software for the message bus 116 may be an application programming interface that permits the message bus 116 to electronically communicate with the compromised identity set service 114 and the security subscription services 146. The application programming interface for the message bus 116 may be a program that when, executed, causes the MB processor 126 to perform the processing for the message bus 116. The MB processor 126 is an electronic processor.

The message bus 116 includes memory 136. The memory 136 may include read-only memory ("ROM"), random access memory ("RAM"), other non-transitory computer-readable media, or a combination thereof. The memory 136 may include instructions that are executable by the MB processor 126. Information stored in the memory 136 is accessible to the ingestion & rules engine 112, the compromised identity set service 114, and the message bus 116.

Due at least in part to the massive amount of information received by the message bus 116 and broadcast from the message bus 116, a human is unable to perform the functions of the message bus 116.

The message bus 116 may communicate, directly or indirectly, with the security subscription service 146. A firewall in the message bus 116 may prevent the security subscription service 146 from accessing the memory 136 and the ingestion & rules engine 112.

The compromised identity set service 114 may communicate, directly or indirectly, with the external services 14. The external services 14 may include the security subscription services 146, device services, and the partner app shopping 144.

The compromised identity set service 114 may receive, from an external service 14, a query 220 to ascertain whether or not the user account information for the system user is compromised. The query 220 may include the identity information that uniquely identifies the system user. When the compromised identity set service 114 receives the query 220, the compromised identity set service 114 may search the dataset 134 to detect whether or not the identity file for the system user is stored in the dataset 134.

The compromised identity set service 114 may output a reply 222 to the external service 14 when the compromised identity set service 114 detects the nonexistence of the identity file for the system user in the dataset 134. The reply 222 notifies the external service 14 of the absence of the breached data in the identity file for the system user. For enhanced security of the reply 222, the compromised identity set service 114 may encrypt the reply 222 before outputting the reply 222 as an encrypted the reply 222.

When the compromised identity set service 114 detects the existence of the identity file for the system user in the dataset 134, the compromised identity set service 114 may process the notification information to determine whether or not the reason for the notification information is the detection of the user account information for the system user in at least one the data entries from the data breach sets 206. When the compromised identity set service 114 determines that the reason for the notification information is the detection of the user account information for the system user in at least one the data entries from the data breach sets 206, the compromised identity set service 114 may output, to the external service 14, the confirmation 222 that notifies the external service 14 of the compromised information in the user account information for the system user. The confirmation 222 may include the identity information that uniquely identifies the system user. The confirmation 222 may include the reason for the notification information. The confirmation 222 may also include the risk score.

Due at least in part to the massive amount of information received by the compromised identity set service 114 and output to the message bus 116, a human is unable to perform the functions of the compromised identity set service 114.

Figure 3A:
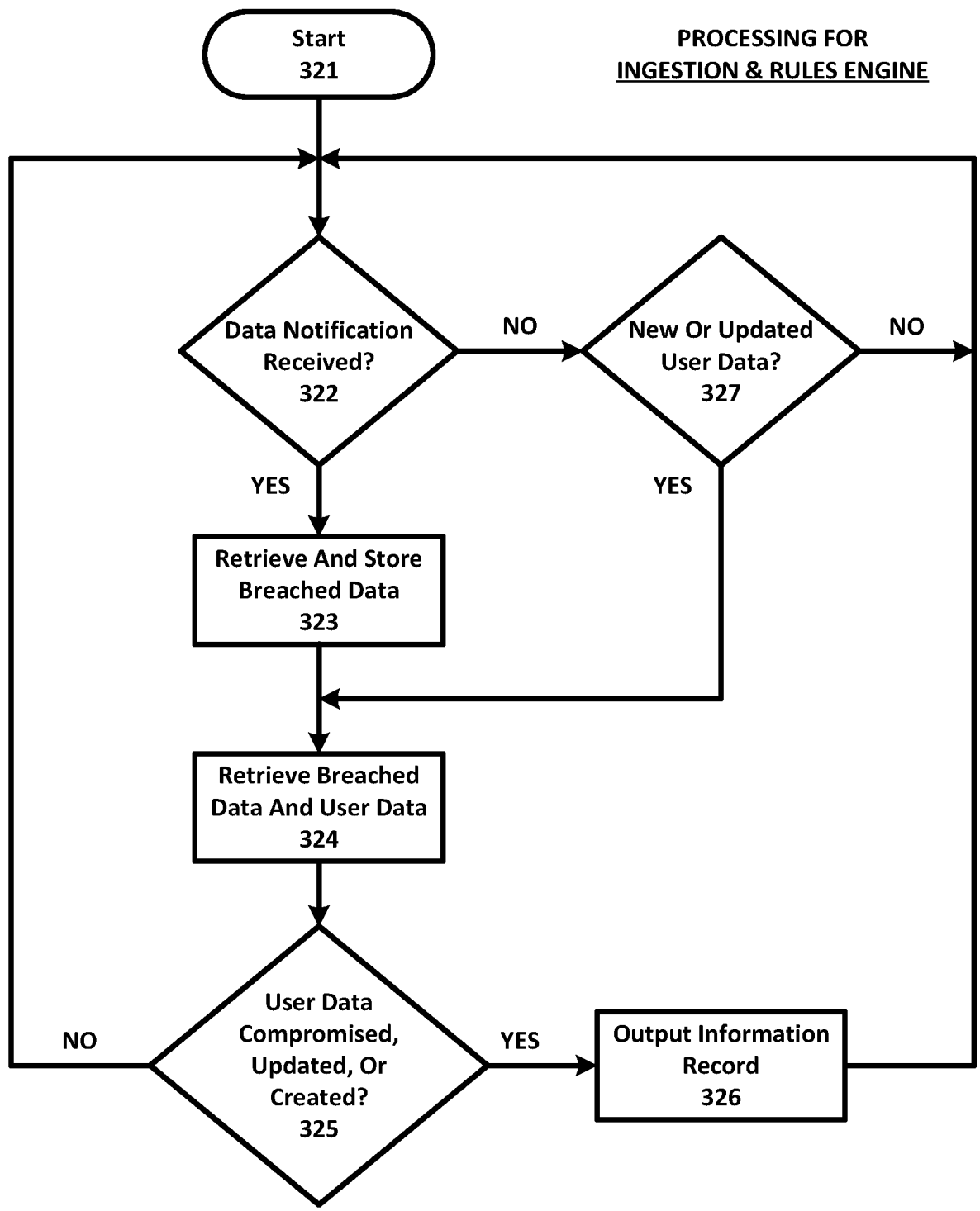
FIG. 3A is a flowchart that illustrates an example of processing for an ingestion & rules engine.

The flowchart in FIG. 3A is an example of processing for the ingestion & rules engine 112. The database 132 may store a program that is executable by the IRE processor 122. The program, when executed, causes the IRE processor 122 to perform the processing for the ingestion & rules engine 112. The IRE processor 122 is an electronic processor that may perform processing for the ingestion & rules engine 112 in the distributed computing environment 16. The IRE processor 122 may perform the processing for the ingestion & rules engine 112 in parallel with the CISS processor 124 performing the processing for the compromised identity set service 114. The IRE processor 122 may perform the processing for the ingestion & rules engine 112 simultaneously with the CISS processor 124 performing the processing for the compromised identity set service 114. The IRE processor 122 may perform the processing for the ingestion & rules engine 112 in parallel with the MB processor 126 performing the processing for the message bus 116. The IRE processor 122 may perform the processing for the ingestion & rules engine 112 simultaneously with the MB processor 126 performing the processing for the message bus 116.

Processing for the ingestion & rules engine 112 may commence in block 321 of FIG. 3A and advance from block 321 to block 322. The data notification 202 informs the IRE processor 122 that the new the data breach set 206 from the information distributor 12 is ready for receipt by the ingestion & rules engine 112. When the IRE processor 122 detects the absence of the data notification 202 from the information distribution in block 322, processing in FIG. 3A advances from block 322 to block 327. Processing in FIG. 3A advances from block 322 to block 323 when the IRE processor 122 detects receipt of the data notification 202 in block 322 by the ingestion & rules engine 112 from the information distribution.

In block 323, the IRE processor 122 may cause the ingestion & rules engine 112 to retrieve the data breach set 206 from the information distributor 12 when the ingestion & rules engine 112 receives the data notification 202 in block 322. When the ingestion & rules engine 112 retrieves the data breach set 206 from the information distributor 12, the IRE processor 122 may cause the ingestion & rules engine 112 to store the data breach set 206 in the database 132 in the form of the data entries. Processing in FIG. 3A advances from block 323 to block 324.

In block 324, the IRE processor 122 may access the identity system 13 to retrieve the user data record 210 for the system user. The user data record 210 may comprise the user account information for the system user. The IRE processor 122 may access the database 132 in block 324 to retrieve the data entries. Processing in FIG. 3A advances from block 324 to block 325.

In block 325, the IRE processor 122 may compare the user data record 210 to the data entries to detect the breached data in the user account information for the system user. The user account information may become compromised user information when the ingestion & rules engine 112 detects at least a portion of the user account information in the data entries. The ingestion & rules engine 112 may designate the user account information as uncompromised user information when the ingestion & rules engine 112 fails to detect at least a portion of the user account information in the data entries. By comparing the user data record 210 to the data entries, the IRE processor 122 may determine whether the user data record 210 includes uncompromised user information or includes compromised user information. When the IRE processor 122 determines that the user data record 210 is uncompromised user information, processing in FIG. 3A advances from block 325 to block 322 and the processing repeats beginning at block 322. Alternatively, processing in FIG. 3A advances from block 325 to block 326 when the IRE processor 122 determines that the user data record 210 includes compromised user information.

Also in block 325, the IRE processor 122 may detect the creation of the user data record 210 when the identity system 13 creates the user data record 210 for the new system user. Processing in FIG. 3A advances from block 325 to block 326 when the IRE processor 122 detects the creation of the user data record 210. The IRE processor 122 may detect an update made by the identity system 13 to the user data record 210. Processing in FIG. 3A advances from block 325 to block 326 when the IRE processor 122 detects that the identity system 13 has made the update the user data record 210.

In block 326, the IRE processor 122 may cause the ingestion & rules engine 112 to output the information record 214 to the compromised identity set service 114. When the IRE processor 122 causes the ingestion & rules engine 112 to output the information record 214, processing in FIG. 3A advances from block 326 to block 322 and the processing repeats beginning at block 322.

In block 327, the IRE processor 122 may detect the creation, by the identity system 13, of the user data record 210. The IRE processor 122 may detect an update made by the identity system 13 to the user data record 210. Processing in FIG. 3A advances from block 327 to block 324 when the IRE processor 122 detects the creation of the user data record 210 or when the IRE processor 122 detects the update to the user data record 210. In the absence of the IRE processor 122 detecting both a creation of the user data record 210 and an update to the user data record 210, processing in FIG. 3A advances from block 327 to block 322 and the processing repeats beginning at block 322.

Figure 3B:
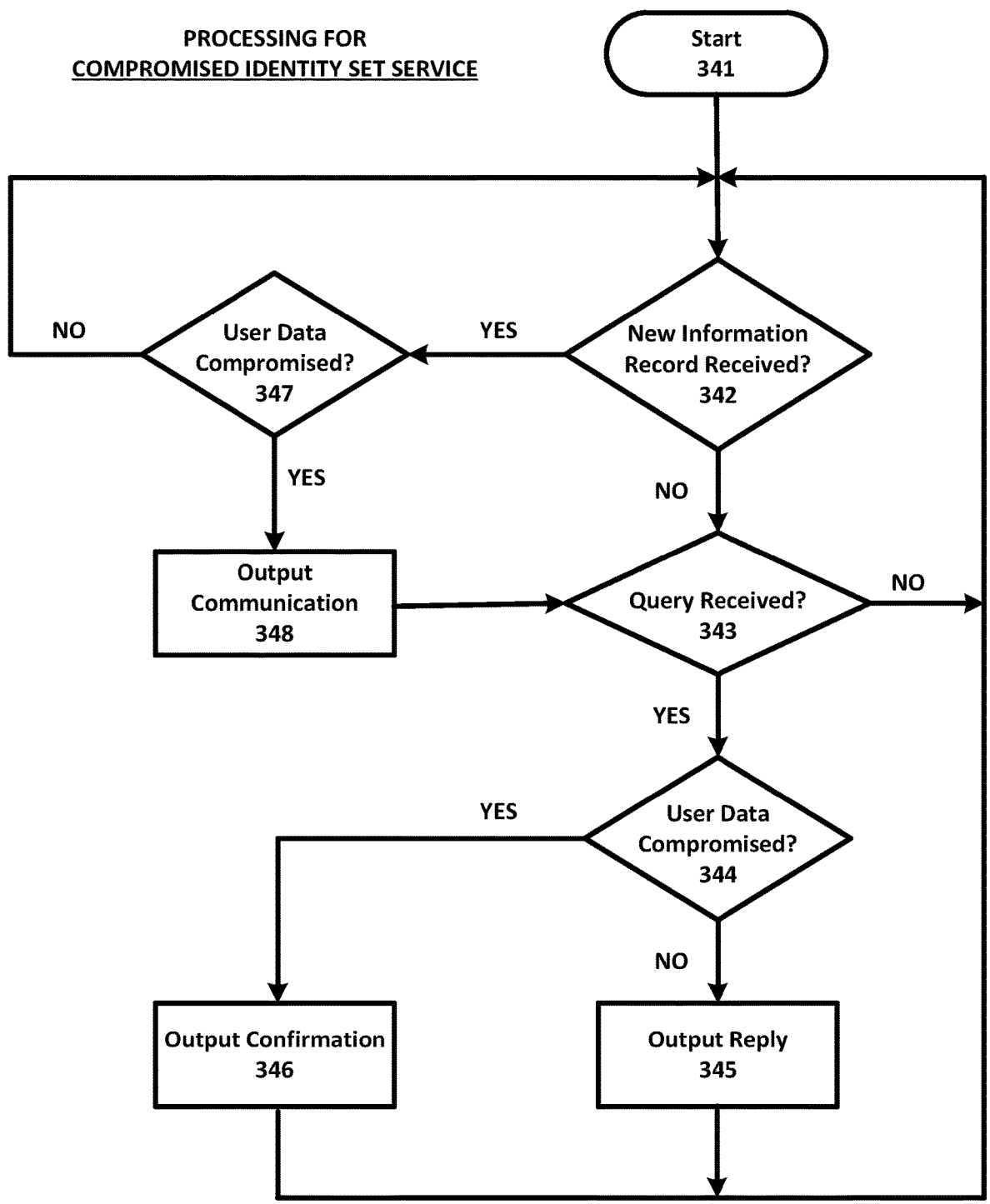
FIG. 3B is a flowchart that illustrates an example of processing for a compromised identity set service.

The flowchart in FIG. 3B is an example of processing for the compromised identity set service 114. The dataset 134 may store a program that is executable by the CISS processor 124. The program, when executed, causes the CISS processor 124 to perform the processing for the compromised identity set service 114. The CISS processor 124 is an electronic processor that may perform processing for the compromised identity set service 114 in the distributed computing environment 16. The CISS processor 124 may perform the processing for the compromised identity set service 114 in parallel with the IRE processor 122 performing the processing for the ingestion & rules engine 112. The CISS processor 124 may perform the processing for the compromised identity set service 114 simultaneously with the CISS processor 124 performing the processing for the ingestion & rules engine 112. The CISS processor 124 may perform the processing for the compromised identity set service 114 in parallel with the MB processor 126 performing the processing for the message bus 116. The CISS processor 124 may perform the processing for the compromised identity set service 114 simultaneously with the MB processor 126 performing the processing for the message bus 116.

Processing for the compromised identity set service 114 may commence in block 341 of FIG. 3B and advance from block 341 to block 342. The compromised identity set service 114 may receive, from the ingestion & rules engine 112, the information record 214 for the system user. When the compromised identity set service 114 receives the information record 214, the CISS processor 124 may designate the information record 214 as a new information record 214. The CISS processor 124 may designate the information record 214 as the new information record 214 when an identity file for the system user is nonexistent in the dataset 134 or when the CISS processor 124 identifies content the information record 214 that is absent from the identity file for the system user. Processing in FIG. 3B advances from block 342 to block 343 in the absence of the CISS processor 124 designating the information record 214 as being a new information record 214.

The compromised identity set service 114 may receive, from an external service 14, the query 220 to ascertain whether or not the user account information for the system user is compromised. The query 220 may include the identity information that uniquely identifies the system user. When the CISS processor 124 detects the absence in block 343 of receipt of the query 220, processing in FIG. 3B advances from block 343 to block 342 and the processing repeats beginning at block 342. Alternatively, processing in FIG. 3B advances from block 343 to block 344 when the CISS processor 124 detects receipt of the query 220 in block 343.

The CISS processor 124 may process the notification information that exists in the identity file for the system user to determine whether or not the reason for generation of the notification information is the detection of the user account information for the system user in at least one the data entries from the data breach sets 206.

Processing in FIG. 3B advances from block 344 to block 345 when the CISS processor 124 determines that the reason for the notification information is other than the detection of the user account information for the system user in at least one the data entries from the data breach sets 206. In block 345, the CISS processor 124 may cause the compromised identity set service 114 output, to the external service 14 that sent the query 220, the reply 222 that notifies the external service 14 of the absence of compromised user information in the identity file for the system user. Processing in FIG. 3B advances from block 345 to block 342 and the processing repeats beginning at block 342.

Processing in FIG. 3B advances from block 344 to block 346 when the notification information in the identity file for the system user informs the CISS processor 124 that compromised user information exists in the identity file. In block 346, the CISS processor 124 may cause the compromised identity set service 114 output, to the external service 14 that sent the query 220, the confirmation 222 that notifies the external service 14 of the existence of the compromised user information in the identity file for the system user. Processing in FIG. 3B advances from block 346 to block 342 and the processing repeats beginning at block 342.

When the CISS processor 124 in block 342 designates the information record 214 received by the compromised identity set service 114 as being a new information record 214, processing in FIG. 3B advances from block 342 to block 347. Processing in FIG. 3B advances from block 347 to block 342 when the CISS processor 124 identifies the absence of compromised user information in the identity file for the system user. The processing repeats beginning at block 342.

Processing in FIG. 3B advances from block 347 to block 348 when the notification information in the identity file for the system user informs the CISS processor 124 that compromised user information exists in the identity file. In block 348, the CISS processor 124 may cause the compromised identity set service 114 output, to the message bus 116, the communication 216 that notifies the message bus 116 of the existence of compromised user information in the identity file for the system user. Processing in FIG. 3B advances from block 348 to block 343.

The flowchart in FIG. 3C is an example of processing for the message bus 116. The memory 136 may store a program that is executable by the MB processor 126. The program, when executed, causes the MB processor 126 to perform the processing for the message bus 116. The MB processor 126 is an electronic processor that may perform processing for the message bus 116 in the distributed computing environment 16. The MB processor 126 may perform the processing for the message bus 116 in parallel with the IRE processor 122 performing the processing for the ingestion & rules engine 112. The MB processor 126 may perform the processing for the message bus 116 simultaneously with the IRE processor 122 performing the processing for the ingestion & rules engine 112. The MB processor 126 may perform the processing for the message bus 116 in parallel with the MB processor 126 performing the processing for the compromised identity set service 114. The MB processor 126 may perform the processing for the message bus 116 simultaneously with the MB processor 126 performing the processing for the compromised identity set service 114.

Processing for the message bus 116 may commence in block 361 of FIG. 3C and advance from block 361 to block 362. The message bus 116 may receive the communication 216 from the compromised identity set service 114. Processing in FIG. 3C remains at block 362 in the absence of the message bus 116 receiving the communication 216 from the compromised identity set service 114. Processing in FIG. 3C advances from block 362 to block 363 when the MB processor 126 detects receipt of the communication 216 in block 362.

In block 363, the MB processor 126 may cause the message bus 116 to broadcast the publication 218 to the security subscription services 146. The publication 218 notifies the security subscription services 146 of the existence of compromised user information in the identity file for the system user. When broadcasting the publication 218 to the security subscription services 146, the message bus 116 may broadcast the publication 218 to all of the security subscription services 146 simultaneously in a single publication 218. Processing in FIG. 3C advances from block 363 to block 362 and repeats beginning at block 362.

Certain operations of methods according to the technology, or of systems executing those methods, can be represented schematically in the figures, or otherwise discussed herein. Unless otherwise specified or limited, representation in the figures of particular operations in particular spatial order can not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular examples of the technology. Further, in some examples, certain operations can be executed in parallel or partially in parallel, including by dedicated parallel processing devices, or separate computing devices configured to interoperate as part of a large system.

In some examples, aspects of the technology, including computerized implementations of methods according to the technology, can be implemented as a system, method, apparatus, or article of manufacture using standard programming or engineering techniques to produce software, firmware, hardware, or any combination thereof to control a processor, also referred to as an electronic processor, (e.g., a serial or parallel processor chip or specialized processor chip, a single-or multi-core chip, a microprocessor, a field programmable gate array, any variety of combinations of a control unit, arithmetic logic unit, and processor register, and so on), a computer (e.g., a processor operatively coupled to a memory), or another electronically operated controller to implement aspects detailed herein. Accordingly, for example, examples of the technology can be implemented as a set of instructions, tangibly embodied on a non-transitory computer-readable media, such that a processor can implement the instructions based upon reading the instructions from the computer-readable media. Some examples of the technology may include (or utilize) a control device such as, e.g., an automation device, a special purpose or programmable computer including various computer hardware, software, firmware, and so on, consistent with the discussion herein. As specific examples, a control device may include a processor, a microcontroller, a field-programmable gate array, a programmable logic controller, logic gates etc., and other typical components that are known in the art for implementation of appropriate functionality (e.g., memory, the communication systems, power sources, user interfaces and other inputs, etc.).

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component can be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) can reside within a process or thread of execution, can be localized on one computer, can be distributed between two or more computers or other processor devices, or can be included within another component (or system, module, and so on).

In exemplary embodiments, the ingestion & rules engine 112, the compromised identity set service 114, the message bus 116, and corresponding elements of FIGS. 1A and 1B may reside at a geographic location such as a country, state, county, city, or building or may reside in a cloud based architecture without a designated geographic location. In another exemplary embodiment, some of the ingestion & rules engine 112, the compromised identity set service 114, the message bus 116, and other corresponding elements of FIGS. 1A and 1B may reside at one or more geographic locations while others reside in one or more cloud based architectures without departing from the spirit of the disclosure herein.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as, e.g., "either," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g., "one or the other but not both") when preceded by terms of exclusivity, such as, e.g., "either," "only one of," or "exactly one of."

In the description above and the claims below, the term "connected" can refer to a physical connection or a logical connection. A physical connection indicates that at least two devices or systems co-operate, communicate, or interact with each other, and are in direct physical or electrical contact with each other. For example, two devices are physically connected via an electrical cable. A logical connection indicates that at least two devices or systems co-operate, communicate, or interact with each other, but may or may not be in direct physical or electrical contact with each other. Throughout the description and claims, the term "coupled" may be used to show a logical connection that is not necessarily a physical connection. "Co-operation," "the communication," "interaction" and their variations include at least one of: (i) transmitting of information to a device or system; or (ii) receiving of information by a device or system.

The word "exemplary" is used herein to mean serving as an example, instance, or illustration. Any aspect or design described herein as "exemplary" is not necessarily to be construed as preferred or advantageous over other aspects or designs.

Any mark, if referenced herein, may be common law or registered trademarks of third parties affiliated or unaffiliated with the applicant or the assignee. Use of these marks is by way of example and shall not be construed as descriptive or to limit the scope of disclosed or claimed embodiments to material associated only with such marks.

Although the present technology has been described by referring to certain examples, workers skilled in the art will recognize that changes can be made in form and detail without departing from the scope of the discussion.

What is claimed is:

1. A system comprising:
   an ingestion & rules engine to:
      receive, electronically from a data breach set, breached data comprising compromised user information,
      receive, electronically from an identity system, account data comprising user account information,
      determine, by comparing the account data with the breached data, whether or not the user account information is found in the compromised user information,
      identify, when the ingestion & rules engine determines that the user account information is found in the compromised user information, the user account information as compromised, and
      output, in an information record when the ingestion & rules engine identifies the user account information as compromised, the user account information;
   a compromised identity set service to:
      store, in a database when the compromised identity set service receives the information record from the ingestion & rules engine, the user account information; and
   a message bus to:
      broadcast, electronically to a plurality of security subscription services when the compromised identity set service stores the user account information, a publication notifying the security subscription services that the user account information is compromised.

2. The system according to claim 1, wherein the user account information is compromised when appropriated without authorization by an owner of the user account information.

3. The system according to claim 1, wherein
   the ingestion & rules engine is to:
      calculate, when the ingestion & rules engine determines that the user account information is in the database, a risk score that quantifies an amount of risk.

4. The system according to claim 3, wherein the information record includes the risk score.

5. The system according to claim 1, wherein
   the compromised identity set service is to:
   receive, electronically from an external service, a query to ascertain whether or not the user account information is compromised.

6. The system according to claim 5, wherein
   the compromised identity set service is to:
   output, electronically to the external service when the compromised identity set service determines that the user account information is in the database, an acknowledgment that the user account information is compromised.

7. The system according to claim 5, wherein the external service is partner app shopping, a device service, or a security subscription service.

8. A method comprising:
   receiving, electronically by an ingestion & rules engine from a data breach set, breached data comprised of compromised user information;
   receiving, electronically by the ingestion & rules engine from an identity system, account data comprised of user account information;
   determining, by the ingestion & rules engine in response to comparing the account data with the breached data, whether or not the user account information is found in the compromised user information;
   designating, by the ingestion & rules engine in response to determining that the user account information is found in the compromised user information, the user account information as compromised; and
   outputting, by the ingestion & rules engine in an information record in response to identifying the user account information as compromised, the user account information;
   storing, by a compromised identity set service in response to receiving the information record from the ingestion & rules engine, the user account information in a database; and
   broadcasting, electronically by a message bus to a plurality of security subscription services in response to the compromised identity set service storing the user account information, a publication notifying the security subscription services that the user account information is compromised.

9. The method according to claim 8, wherein the user account information is compromised when appropriated without authorization by an owner of the user account information.

10. The method according to claim 8, further comprising:
    calculating, by the ingestion & rules engine when the ingestion & rules engine determines that the user account information is in the database, a risk score that quantifies an amount of risk.

11. The method according to claim 10, wherein the information record includes the risk score.

12. The method according to claim 8, further comprising:
    receiving, by the compromised identity set service electronically from an external service, a query to ascertain whether or not the user account information is compromised.

13. The method according to claim 12, further comprising:

outputting, electronically by the compromised identity set service to the external service when the compromised identity set service determines that the user account information is in the database, an acknowledgment that the user account information is compromised.

14. The method according to claim 12, wherein the external service is partner app shopping, a device service, or a security subscription service.

15. A non-transitory processor-readable memory storing instructions that, when executed by an electronic processor cause an ingestion & rules engine to:
receive, electronically from an information distributor by wire or wirelessly via a communication network, a data breach set;
extract, electronically from the data breach set, breached data comprised of compromised user information;
receive, electronically from an identity system by wire or wirelessly via the communication network, account data comprised of user account information; and
determine, in response to comparing the account data with the breached data, whether or not the user account information is found in the compromised user information.

16. The non-transitory processor-readable memory according to claim 15, wherein the instructions, when executed by the electronic processor cause the ingestion & rules engine to:
output, to a compromised identity set service in response to determining that the compromised user information includes the user account information, the user account information in an information record.

17. The non-transitory processor-readable memory according to claim 15, wherein the instructions, when executed by the electronic processor cause the ingestion & rules engine to:
designate, in response to determining an absence of the user account information in the compromised user information, the user account information as uncompromised.

18. The non-transitory processor-readable memory according to claim 15, wherein the breached data is information that is personal, sensitive, private, and/or proprietary.

19. The non-transitory processor-readable memory according to claim 15, wherein the compromised information may include usernames, passwords, addresses, credit card information, banking information, and/or any other information that is personal, sensitive, private, and/or proprietary.

20. The non-transitory processor-readable memory according to claim 15, wherein the ingestion & rules engine is to receive the data breach set from the information distributor intermittently.

21. The non-transitory processor-readable memory according to claim 15, wherein the ingestion & rules engine is to receive the data breach set from the information distributor on a schedule or a timetable.

* * * * *